United States Patent [19]

Ragot

[11] 4,284,928

[45] Aug. 18, 1981

[54] SWITCHABLE VERY-HIGH-VOLTAGE DIRECT-CURRENT POWER SUPPLY FOR CAPACITIVE LOAD

[75] Inventor: Claude Ragot, Paris, France

[73] Assignee: Thomson-CSF, Paris, France

[21] Appl. No.: 72,625

[22] Filed: Sep. 5, 1979

[30] Foreign Application Priority Data

Sep. 8, 1978 [FR] France .................. 78 25851

[51] Int. Cl.³ .................................... H01J 29/80
[52] U.S. Cl. ............................ 315/375; 358/73
[58] Field of Search ............... 315/375; 358/72, 73; 328/258; 363/17, 63, 132; 307/19, 20, 71, 77

[56] References Cited

U.S. PATENT DOCUMENTS

| | | |
|---|---|---|
| 3,892,977 | 7/1975 | Bierly .................. 358/73 |
| 3,914,617 | 10/1975 | Corbel .................. 358/73 |
| 4,104,564 | 8/1978 | Cohen et al. .......... 358/73 |

*Primary Examiner*—Theodore M. Blum
*Attorney, Agent, or Firm*—Karl F. Ross

[57] ABSTRACT

A power supply designed primarily for polychrome cathode-ray tubes of the penetration type and capable of switchover to three and/or four levels comprises a main high-voltage source and one or more auxiliary sources having lower rated voltage values, the auxiliary source or sources being combined with the main source by means of a set of switches according to the total value of voltage to be applied to the polychrome cathode-ray tube in order to obtain a predetermined color. A circuit for recovering the switching energy is associated with the four-level supply system.

12 Claims, 3 Drawing Figures

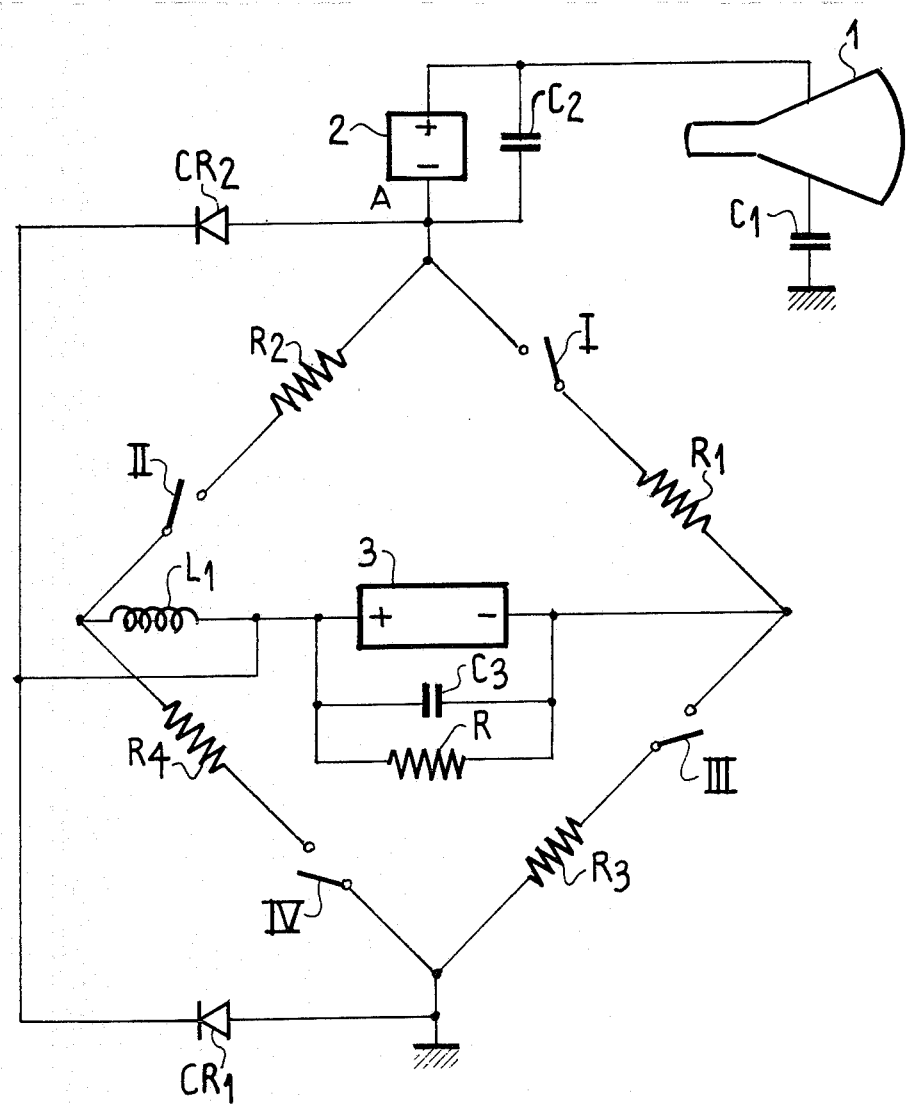
FIG_1

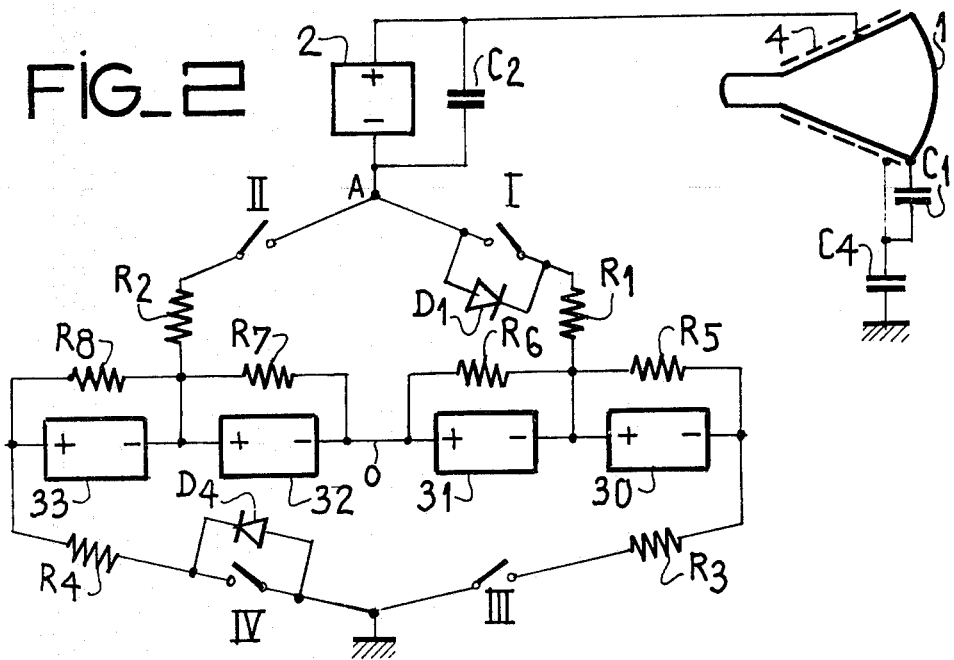
FIG_2
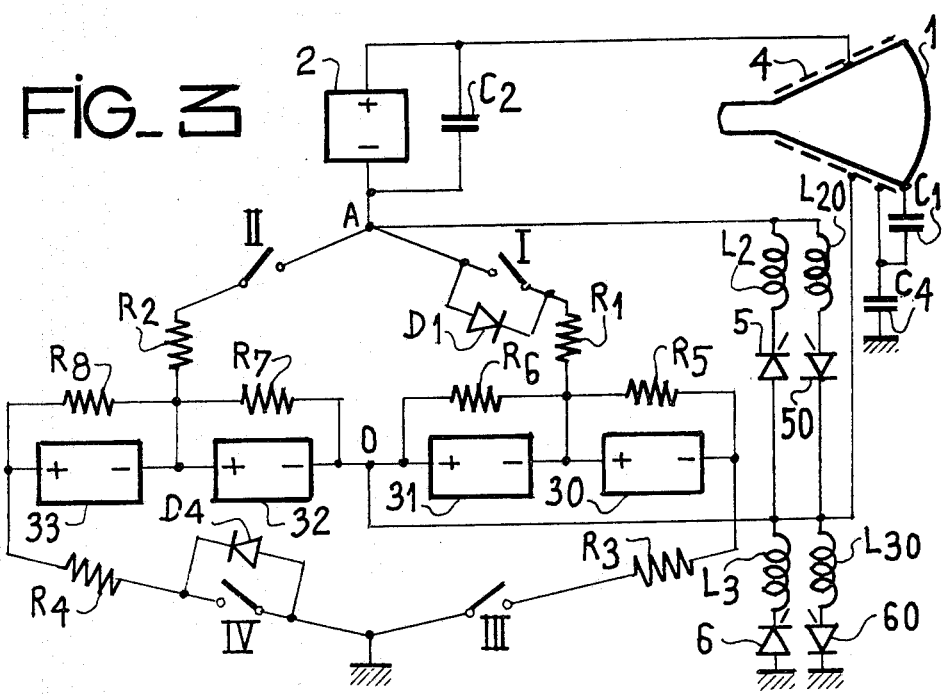
FIG_3

SWITCHABLE VERY-HIGH-VOLTAGE DIRECT-CURRENT POWER SUPPLY FOR CAPACITIVE LOAD

FIELD OF THE INVENTION

My present invention relates to a power supply of the switchover type capable of energizing a capacitive load with a very high voltage (VHV) which can assume different values at predetermined instants and can quickly pass from one value to another.

BACKGROUND OF THE INVENTION

One particularly advantageous application for a power supply of this type is its utilization in penetration-type polychrome cathode-ray tubes used for equipping visual-display consoles. In such penetration tubes, the screen is constituted by multiple layers which, in accordance with current practice, consist of two or three fluorescent layers of different colors separated by one or two barrier layers. Depending on the final acceleration voltage applied to the electron beam, the electrons excite one of the color layers and induce the appearance of the corresponding color.

Thus, only the fluorescent layer located on the side nearest the electron gun is excited and a red color appears in the case of a low acceleration voltage of the order of 10 kV. In the case of a higher acceleration voltage such as 18 kV, the fluorescent layer on the front side of the screen is excited, thus displaying a green color. In the case of intermediate voltage values, a mixture of the two colors just mentioned is obtained in a two-layer tube. In a tube having three fluorescent layers, the number of colors and of color mixtures is greater.

It is therefore apparent that, in order to present colored images with penetration tubes, it is necessary to pass rapidly from one value of the very-high-voltage supply to another. In fact, a polychrome penetration tube cannot emit a number of different colors at the same time and is capable of doing so only sequentially at the rate of switching of the anode voltage. Retinal persistence, however, enables the eye to see a single image in several colors.

The change of color in the case of a polychrome tube is produced by variation of its anode voltage. In the case of electromagnetic deflection, the angle of deflection of the electron beam then varies in inverse ratio to the square root of the anode voltage. Scanning is corrected as a function of this law so as to ensure that the variation in anode voltage which is necessary for operation of the tube does not cause any variations in the dimensions of the image.

The energy of an electron differs according to the anode voltage and therefore according to the color. Furthermore, the efficiency of the phosphor which forms the layers is different; it appears necessary to correct the anode current in order to obtain a luminance which does not vary as a function of the colors formed on the screen of the tube.

Correction of the electron-beam deflection and of the luminance of the cathode-ray tube does not involve any difficulties for which no acceptable solutions have been found.

On the other hand, the variations in anode voltage do present problems arising from the fact that the voltage to be switched is of high value (of the order of at least 8 kV), and that this switching operation must take place in a short period of time in order to leave a sufficient image trace interval and is performed with a relatively high anode capacitance of the order of at least 500 pf.

The value of the anode voltage must therefore be very accurate in order to ensure correct positioning of the spot on the screen.

Different solutions have already been proposed for the design of a switchable very-high-voltage power supply.

One system makes use of a vacuum tube adapted to carry out a series regulation for charging the capacitor of the polychrome tube while another such tube serves to discharge the capacitor at the moment of switching operations. This device has a disadvantage in that it does not permit short switching times.

Another system, which can be considered an improvement over the foregoing one, utilizes two pulse transformers for reducing the rise time or decay time of transients. A first transformer delivers a positive pulse of the order of 8 kV for charging the tube capacitor to a level of the order of 10 to 18 kV. After the steady-level state has been reached, a second transformer delivers a negative pulse of the order of 8 kV in order to reduce the charge on the tube capacitor from 18 kV to 10 kV. One of the disadvantages of this arrangement lies in the fact that, in order to obtain intermediate anode voltages which make it possible to have colors other than the basic primary colors, the number of these circuit components must be increased according to the number of voltages to be switched. Under these conditions, the system rapidly becomes cumbersome and costly.

A further system provides a number of high-voltage generators corresponding to the number of cathode-ray-tube operating voltages to be established. These voltages are selected by a switch. In a system of this type, however, the switch must be capable of holding the voltage to be switched and of operating at sufficiently high speed. An electromechanical device can be employed but it is preferable to adopt an electronic device constituted by a certain number of transistors or of thyristors. However, a switch of this type which maintains the selected voltage in each position thereof is not easy to construct.

OBJECT OF THE INVENTION

The aim of the invention is to provide a switchable very-high-voltage power supply for a polychrome cathode-ray tube which establishes several precisely defined voltage levels while avoiding the drawbacks mentioned above.

SUMMARY OF THE INVENTION

In accordance with my present invention I provide a very-high-voltage direct-current power supply for a capacitive load, specifically a polychrome cathode-ray tube in which that load is constituted by a capacitance between an accelerating anode thereof and ground, which comprises a main direct-current source of high nominal voltage connected in series with that load across one diagonal of a bridge circuit with four resistance arms across whose other diagonal at least one auxiliary direct-current source of low nominal voltage is connected. A set of four switches, respectively inserted in the arms of the bridge, are operable in pairs for additively combining the voltages of the main and auxiliary sources in a first position, subtractively combining these voltages in a second position, and disconnecting the auxiliary source from the load in a third position so as to leave only the main source effective to energize the load. This establishes three distinct voltage levels which, when applied to the accelerating anode of a cathode-ray tube of the aforedescribed type, will excite as many different color layers to emit, say, the colors red, green and orange.

A more elaborate power supply according to my invention, designed to establish more than three voltage levels, includes additional direct-current sources of lower nominal voltage than the main source connectable in various combinations to one another by the aforementioned switches. More particularly, I may provide a second auxiliary source inserted in series-aiding relationship with the first source in the corresponding bridge diagonal along with third and fourth auxiliary sources, of lower nominal voltage than the first two, inserted in series-aiding relationship therewith in two adjoining arms of the bridge circuit paralleling that diagonal.

Pursuant to a further feature of my invention, the load capacitance may be divided into two series capacitances formed in the case of a cathode-ray tube between the accelerating anode and an ungrounded shield and between that shield and ground respectively. With two auxiliary sources of the same terminal voltage inserted in a diagonal of the bridge circuit, their common terminal represents a midpoint of that diagonal which, pursuant to another feature of my invention, can be connected to the junction of the two series capacitances (i.e. the shield of the cathode-ray tube) and to a circuit enabling recovery of charging energy. Such a circuit comprises a first pair of parallel inductive branches connected between the capacitance junction and one corner of the diagonal which is in series with the main source, a second pair of parallel inductive branches connected between that junction and the opposite corner of the last-mentioned diagonal, and an electronic switch such as a thyristor in each of these branches triggerable to enable a resonant charge reversal of the capacitance connected to the same corner.

The above and other features of my invention will become apparent from the following description of exemplified embodiments, reference being made to the accompanying drawing in which:

FIG. 1 is a diagram of a very-high-voltage power supply designed for switchover to three levels;

FIG. 2 is a diagram of a very-high-voltage power supply designed for switchover to four levels; and FIG. 3 is a diagram of a device for the recovery of switching energy, associated with the power supply of FIG. 2.

SPECIFIC DESCRIPTION

FIG. 1 is a schematic illustration of a very-high-voltage supply system according to my invention which permits switchover to three levels, i.e. which produces three voltage stages corresponding to two primary colors and one intermediate color.

The power supply of FIG. 1 essentially comprises a main high-voltage d-c source 2 decoupled from high frequencies by a large shunt capacitor $C_2$ whose positive terminal is connected to the polychrome tube 1, a condenser $C_1$ representing the equivalent capacitance of this tube with respect to ground or with respect to its shield. In the latter instance, as shown in FIG. 2, shield 4 has a ground capacitance $C_4$ in series with capacitance $C_1$. An auxiliary voltage source 3 decoupled by a capacitor $C_3$ shunted by a resistor R, this network lying in series with an inductance coil $L_1$ in a diagonal of a bridge with four resistance arms $R_1$, $R_2$, $R_3$, $R_4$. The other bridge diagonal is connected between ground and the negative terminal A of source 2; two diodes $CR_1$ and $CR_2$ are inserted, in bucking relationship, between the corners of the latter diagonal and have their cathodes tied to the positive terminal of source 3 so as to offer a high resistance to that source. The four bridge arms include respective switches I, II, III, IV which can be controlled in such a manner that, depending on their state of opening or closure, they permit a combination of voltages of sources 2 and 3 so as to produce the requisite voltage levels for exciting the primary colors on the polychrome cathode-ray tube 1 as well as the intermediate color.

As will become apparent hereinafter, the auxiliary voltage source 3 has an output which is distinctly lower (of the order of 4 kV, for example) than the output of the main voltage source 2 which attains 14 kV. By virtue of the set of switches I, II, III and IV, the auxiliary voltage source 3 will be able to supply positive voltage (+4 kV), negative voltage (−4 kV), or zero voltage in which case the source will be cut out of circuit. Three voltages having values of 18 kV, 10 kV and 14 kV will thus be made available and correspond to the three primary colors of the polychrome tube, namely green for 18 kV, orange for 14 kV and red for 10 kV.

The two regulated voltage sources 2 and 3 are mutually independent and isolated from ground. It is thus noted that, at the time of switchover, the voltage across the terminals of the shunt capacitors $C_1$, $C_2$ and $C_3$ will vary as a function of the voltage change and of the value of the equivalent capacitance $C_1$ of the cathode-ray tube 1 whose magnitude is relatively low, that is to say of the order of 300 to 500 pf (which is the case with polychrome tubes). The magnitudes of the capacitances $C_2$ and $C_3$ are moderately high, namely of the order of 47 nF and 0.1 μF, thereby ensuring a sufficient degree of accuracy in regard to the desired voltage level.

The operation of the device in FIG. 1 is as follows:

When, in a first position, the switches II and III are in the conducting state (i.e. closed) and the switches I and IV are open or in the non-conducting state, the charging current of tube capacitance $C_1$ flows from ground through the resistor $R_3$, the switch III, the capacitor $C_3$, the inductance coil $L_1$, the switch II, the resistor $R_2$ and the capacitor $C_2$. The two sources 3 and 2 are aidingly interconnected whereby the values of their normal rated voltages are added. In this case, the voltage applied to the anode of the cathode-ray tube is 14+4=18 kV corresponding to a green color.

When, in a second position, the switches I and IV are in the conducting state while the switches II and III are open, the discharge current of capacitance $C_1$ flows through the switch IV, the resistor $R_4$, the inductance coil $L_1$, the capacitor $C_3$, the resistor $R_1$, the switch I and the capacitor $C_2$. The resistor R in parallel with the capacitor $C_3$ enables the flow of a continuous current through source 3 which opposes a reverse current that would normally flow through this source upon the discharge of the capacitance of the cathode-ray tube 1. The two sources 2 and 3 are now connected in bucking relationship whereby the values of their normal rated voltages are subtractively combined. In this case the voltage applied to the anode of the cathode-ray tube is $14-4=10$ kV corresponding to a red color.

In order to produce the anode voltage at 14 kV corresponding to orange color, the switches must be in a third position such that the source 3 does not come into action. For this purpose it is necessary to close the switches of two adjoining bridge arms, i.e. either to have the switches II and IV in the conducting state and the switches I and III in the open state or, conversely, the switches I and III in the conducting state and the switches II and IV in the open state. By way of example, I may choose the first case in which the switches II and IV are closed.

If the capacitance $C_1$ is initially charged to 10 kV, its charge must be increased to 14 kV. The charging current passes through the diode $CR_1$, the inductance coil $L_1$, the switch II, the resistor $R_2$, the capacitor $C_2$.

If the capacitance $C_1$ is initially charged to 18 kV, its charge must be reduced to 14 kV. The discharge current passes through the switch IV, the resistor $R_4$, the inductance coil $L_1$, the diode $CR_2$ and the capacitor $C_2$.

Under these conditions, only the source 2 is included in the circuit and the anode voltage of the cathode-ray tube is equal to 14 kV corresponding to orange.

Switches I, II, III, and IV must be capable of carrying a voltage of 4 kV as generated by the auxiliary source 3. These switches can be mechanical or electronic devices, specifically vacuum tubes, gas tubes or transistors. In a preferred example, they are constituted by series-connected thyristors triggered by an insulating transformer with as many secondary windings as there are thyristors and a primary winding to which the control voltage is applied as long as it is desired to maintain the switch in the closed state.

The inductance coil $L_1$ of FIG. 1, connected to the positive pole of the auxiliary source 3, performs a double function in my improved power supply. In the first place, it forms with capacitance $C_1$ and with the various resistors damped series-resonant circuit which determines the switching time of the system. The switching waveform then assumes the shape of a half-sinusoid instead of an exponential curve and the slope of its voltage variation is more nearly constant. The mode of operation of the resonant circuit causes a slight overshoot distortion so that the diodes $CR_1$ and $CR_2$ clip the voltage waveform as soon as this latter tends to overshoot $\pm 4$ kV. This arrangement serves to give a linear form to the switchover.

The second function of this inductance coil is to ensure protection of the thyristors when these latter are employed as the switches of the bridge arms. This coil in fact prevents any excessive variation of the current at its terminals and suppresses transient voltage variations at the time of switchover thus preventing these variations from appearing at the terminals of the switches which are in the conducting state and which would transmit them to the terminals of the nonconducting switches.

FIG. 2 is a diagrammatic illustration of a very-high-voltage supply which permits switchover to four levels.

The basic inventive concept remains the same as in the embodiment of FIG. 1, namely the utilization of a main supply sources having a high normal rated voltage and auxiliary sources having lower normal voltages with switching operations for combining the various sources in order to obtain the voltages to be applied to the polychrome tube for exciting the four desired primary colors.

In the embodiment shown in FIG. 2, four colors can be obtained on the screen of the polychrome tube 1, namely red, orange, yellow and green. Intermediate colors can also be obtained by mixing the red and green primary colors excited by the selected voltages. In one example of practical application of the invention, voltages corresponding to the selected colors are as follows:
red: 10 kV
orange: 13.2 kV
yellow: 14.8 kV
green: 18 kV These voltages are applied to the anode of the polychrome tube, the anode capacitance $C_1$ of the tube being connected across the switchable sources through the fixed voltage source 2 which is again decoupled by a shunt capacitance $C_2$. The auxiliary voltage generator consists here of four sources 30, 31, 32, 33 having different output voltages which can be combined with that of the main voltage source 2 by a bridge with resistance arms $R_1$, $R_2$, $R_3$, $R_4$ in series with respective switches I, II, III and IV. By way of example, the values of the auxiliary voltages are 800 V in the case of the sources 30 and 33 and 1600 V in the case of the sources 31 and 32. Sources 30 and 33 lie in series with the resistors $R_3$ and $R_4$ of the third and fourth bridge arms as well as with sources 31 and 32 which are inserted in the diagonal separating these arms from the other two arms. Each of these sources is connected across a respective load, represented as a resistor $R_5$, $R_6$, $R_7$, $R_8$, whose purpose—like that of resistor R in FIG. 1—is the blocking of reverse-current flow therethrough.

The operation of this four-level power supply is as follows:

The switches I, II, III and IV, which operate in pairs as in the embodiment of FIG. 1, selectively cut in the auxiliary sources so as to produce combinations thereof with the main source 2 in order to obtain the different voltages to be applied to the anode of the polychrome tube 1.

When the switches II and III for example are closed while the other two switches I and IV are open, the total voltage applied to the anode of tube 1 is $14+1.6+1.6+0.8=18$ kV corresponding to green.

When the switches I and III are closed while the other two switches II and IV are open, the total voltage applied to the anode of tube 1 is $14+0.8=14.8$ kV corresponding to yellow.

When the switches II and IV are closed while the other two switches I and III are open, the total voltage applied to the anode of tube 1 is $14-0.8=13.2$ kV corresponding to orange.

Finally, when the switches I and IV are closed while the other two switches II and III are open, the total voltage applied to the anode of tube 1 is $14-(1.6+1.6+0.8)=10$ kV corresponding to red.

The switches of FIG. 2 are also preferably constituted by thyristors mounted in series and controlled by means of pulse transformers for ensuring simultaneous control of concurrently operating thyristors.

In the diagram of FIG. 2, the auxiliary sources are shown separate and distinct from each other. I prefer to use two three-stage voltage multipliers connected to a common transformer so that each stage delivers a voltage of 800 V. For practical reasons, and because thyristors are employed, protective diodes $D_1$, $D_4$ are respectively disposed in parallel with the switches I and IV. In fact, in the circuit arrangement shown in FIG. 2, the voltage sources are all operational during both charge and discharge of the capacitance $C_1$ but do not necessarily contribute to the anode current of the cathode-ray tube. When a source delivers a negative voltage in order to discharge the tube capacitance, the direction of the anode current is opposite to the discharge current. A reverse current then passes through the voltage source and the switch and may cut off the diodes of the voltage multiplier employed for producing the requisite negative voltage which could modify the value of that voltage to a considerable extent. The same applies to electronic switches of the one-way-conduction type such as thyristors. The presence of the diodes $D_1$ and $D_4$, however, maintains the conduction.

The presence of the ungrounded shield 4 and the two cascaded capacitances $C_1$ and $C_4$, coupled with the fact that the auxiliary sources have a mid-point indicated at 0, makes it possible to associate an energy-recovery circuit with each of these capacitances as illustrated in FIG. 3.

As shown in the latter Figure, the midpoint 0 of the auxiliary sources is connected to the shield 4 of the polychrome tube but the operation of the supply system of FIG. 2 is not affected thereby. The recovery circuit associated with capacitance $C_1$ comprises two inductive branches $L_2$, $L_{20}$ inserted between shield 4 and source terminal A in series with two oppositely poled thyristors 5 and 50, respectively. The recovery circuit associated with capacitance $C_4$ similarly comprises two inductive branches $L_3$, $L_{30}$ inserted between shield 4 and ground in series with two oppositely poled thyristors 6 and 60, respectively.

The operation of a recovery circuit of this type is based on the properties of LC resonant circuits. The circuit capacitance is charged to a predetermined voltage. Upon closure of a switch such as the associated thyristor, the energy of the capacitance is transferred to the inductance coil in the form of a current $Li^2/2$, where i represents the current. The inductance coil then restitutes its energy to the capacitance by recharging same with reverse polarity. The resonant energy transfer thus achieved is completed when the current within the inductance coil goes to zero. If the switch is then opened, the capacitive charge has changed from a positive voltage value to an equal negative value without any loss of energy other than that due to the resistance of the oscillating circuit.

In the embodiment of FIG. 3, if it is desired to change the polarity of the voltage difference between the anode of the tube 1 and its shield 4, for example, the switches I and II are first opened and a trigger pulse is applied to the thyristors 50 and 5. Current will pass only through that branch of the resonant circuit which has the correct polarity, i.e. coil $L_2$ in series with thyristor 5 or coil $L_{20}$ in series with thyristor 50. The energy of the capacitance $C_1$ is then converted into current within the inductance coil $L_2$ or $L_{20}$ which is actually in circuit so as to be restituted to the capacitance $C_1$ in the form of a voltage of opposite sign. A small fraction of the energy which passes through this circuit is dissipated within its internal resistance and the charging voltage of the capacitance $C_1$ will not have quite the same absolute value. This voltage can, however, be restored to the original magnitude by closing the switch I or the switch II, depending on the sign of the charge. The energy to be delivered by the sources 31 and 32 then is only the fraction dissipated within the circuit $L_2C_1$ or $L_{20}C_1$. In the event that the capacitance $C_4$ comes into operation, energy recovery is carried out in the same manner by means of the inductance coil $L_3$ or $L_{30}$ which is associated respectively with the switches 6 or 60.

The length T of a half-cycle of the recovery circuits hereinabove described which can operate simultaneously, should equal the switching time and is given by $T = \pi\sqrt{LC}$, to which there may nevertheless have to be added the time needed by the voltage source to supplement the charge of either capacitance $C_1$, $C_4$.

I claim:

1. A very-high-voltage direct-current power supply for a capacitive load, comprising:
   a bridge circuit with four resistance arms;
   a main direct-current source of high nominal voltage connected in series with said load across one diagonal of said bridge circuit;
   at least one auxiliary direct-current source of lower nominal voltage connected across the other diagonal of said bridge; and
   a set of four switches respectively inserted in said arms and operable in pairs for additively combining the voltages of said main and auxiliary sources in a first position, subtractively combining the voltages of said main and auxiliary sources in a second position, and disconnecting said auxiliary source from said load in a third position.

2. A power supply as defined in claim 1, further comprising a first and a second capacitor respectively connected in shunt with said main and said auxiliary source.

3. A power supply as defined in claim 2, further comprising a resistor in parallel with said second capacitor forming a direct-current loop across said auxiliary source.

4. A power supply as defined in claim 1, 2 or 3, further comprising an inductance in said other diagonal in series with said auxiliary source.

5. A power supply as defined in claim 4, further comprising a pair of diodes each connected with high-resistance polarity between a terminal of said auxiliary source and a respective corner of said one diagonal.

6. A power supply as defined in claim 1, further comprising a second auxiliary direct-current source of lower nominal voltage than said main source inserted in series-aiding relationship with the first auxiliary source in said other diagonal.

7. A power supply as defined in claim 6, comprising a third and a fourth auxiliary direct-current source of lower nominal voltage than said first and second sources inserted in series-aiding relationship with the latter sources in two adjoining arms of said bridge circuit paralleling said other diagonal, said switches being operable in said first position for additively combining the voltages of all said sources, in said second position for subtractively combining the voltage of said main source with the voltages of said first auxiliary source, said second auxiliary source and one of the other two sources, in said third position for additively combining the voltages of said main source and of one of said other two sources, and in a fourth position for subtractively combining the voltages of said main source and of one of said other two sources.

8. A power supply as defined in claim 7 wherein said main source and said first, second, third and fourth auxiliary sources have nominal voltages of 14 kV, 1.6 kV, 1.6 kV, 0.8 kV and 0.8 kV, respectively.

9. A power supply as defined in claim 7 or 8 wherein the switches closed in said fourth position are provided with protective diodes in shunt therewith.

10. A power supply as defined in claim 6, 7 or 8 wherein said load essentially consists of two series capacitances, further comprising a first pair of parallel inductive circuit branches connected between a junction of said capacitances and one corner of said one diagonal, a second pair of parallel inductive circuit branches connected between said junction and the opposite corner of said one diagonal, said junction being further connected to a common terminal of said first and second auxiliary sources, and an electronic switch in each of said circuit branches triggerable to enable a resonant charge reversal of the capacitance connected to the same corner of said one diagonal.

11. A power supply as defined in claim 10 wherein said load comprises a polychrome cathode-ray tube with an ungrounded shield defining with an accelerating anode thereof one of said series capacitances, the other of said series capacitances being formed between said shield and ground.

12. A power supply as defined in claim 11 wherein said electronic switches are thyristors.

* * * * *